United States Patent
Kuusinen et al.

(10) Patent No.: US 6,961,780 B2
(45) Date of Patent: Nov. 1, 2005

(54) SUSPEND STATE

(75) Inventors: Jarmo Kuusinen, Jyväskylä (FI); Mika Liljeberg, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 806 days.

(21) Appl. No.: 09/867,127

(22) Filed: May 29, 2001

(65) Prior Publication Data

US 2001/0049731 A1 Dec. 6, 2001

(30) Foreign Application Priority Data

May 31, 2000 (FI) .............................................. 20001316

(51) Int. Cl.[7] ........................ G01R 31/08; H04Q 11/00; H04B 7/14; H04B 17/02; G06F 15/173
(52) U.S. Cl. ........................ 709/238; 709/223; 709/227; 455/7; 455/11.1; 370/229; 370/230; 370/310; 370/330; 370/469; 340/7.29
(58) Field of Search ................................. 709/227–229, 709/223, 238; 340/993, 3.5, 425.1, 7.3; 455/11.1, 7; 370/230, 231, 310, 410, 469, 352

(56) References Cited

U.S. PATENT DOCUMENTS

| | | | |
|---|---|---|---|
| 5,291,481 A | * | 3/1994 | Doshi et al. ................. 370/230 |
| 5,745,695 A | | 4/1998 | Gilchrist et al. ........ 395/200.57 |
| 6,208,620 B1 | | 3/2001 | Sen et al. .................... 370/231 |
| 6,400,281 B1 | * | 6/2002 | Darby et al. ................. 340/933 |

FOREIGN PATENT DOCUMENTS

| | | |
|---|---|---|
| EP | 0872982 A1 | 10/1998 |
| EP | 1096813 A2 | 5/2001 |
| WO | WO 00/76139 A1 | 12/2000 |

OTHER PUBLICATIONS

"Congestion Avoidance With BUC (Buffer Utilization Control) Gateways and RFCN (Reverse Feedback Congestion Notification)," Ziegler et al., 1997 IEEE International Performance, Computing and Communications Conference, pp. 410–418.

* cited by examiner

Primary Examiner—Jeffrey Pwu
(74) Attorney, Agent, or Firm—Perman & Green, LLP

(57) ABSTRACT

The invention relates to a method of managing a suspend state of a packet-switched service in a system which comprises a terminal (MS) and another peer (12), there being a packet-switched connection between the terminal and the other peer over which the terminal and the other peer transmit packets to each other. The terminal (MS) is able to use only either a circuit-switched service or a packet-switched service at the same time. When the terminal (MS) switches to the suspend state in the packet-switched service to use a circuit-switched service, a predetermined first packet (31) is transmitted from the terminal (MS) to the other peer (12) to prevent transmission of packets from the other peer (12) to said terminal (MS) during the suspend state. The invention also relates to a terminal and software.

21 Claims, 3 Drawing Sheets

SUSPEND STATE

FIELD OF THE INVENTION

The present invention relates to telecommunications networks which provide both circuit-switched and packet-switched services for terminals. Particularly, but not necessarily, the invention relates to processing of a GPRS suspend state (General Packet Radio Service). Even though the GPRS system is used as an example in the description, in essence the invention can also be implemented in a third-generation network, such as a WCDMA network (Wide-band Code Division Multiple Access) or in a corresponding communication system.

BACKGROUND OF THE INVENTION

In packet-switched transmission the information to be transmitted over a network is split into small data units called packets. The packets, which include the recipient's address information, are transferred from the sender to the recipient by routing their route in the network according to the recipient's address. In packet-switched transmission the same radio resources can be divided between several users according to the need.

The GPRS is a packet-switched telecommunications service of the GSM network (Global System for Mobile Communications) which supplements the existing services, such as conventional circuit-switched communication and short message service (SMS). In conventional circuit-switched communication between a wireless terminal, such as a mobile station or a computer terminal, and a base station subsystem (BSS) radio resources are typically reserved by reserving a physical (radio) channel for the duration of a call, the physical channel referring to a certain time slot of the transmission frame on a certain frequency band. The GPRS enables dynamic reservation of physical channels for transmission. In other words, a physical channel is reserved for a certain MS-BSS link only when data are being transmitted. Thus unnecessary reservation of radio resources can be avoided when there are no data to be transmitted.

The GPRS is intended to function together with circuit-switched transmission of a conventional GSM network to use the air interface efficiently for data and speech communications. For this reason, the GPRS employs the basic channel structure defined for the GSM. In the GSM a certain frequency band is divided into a string of transmission frames in the time domain which are known as TDMA frames (Time Division Multiple Access). The duration of a TDMA frame is 4.615 ms. Each TDMA frame is divided into eight successive time slots which are equal in duration. When a call is set up in the conventional circuit-switched transmission mode, a physical channel is defined for this call by reserving a certain time slot (1 to 8) in each TDMA frame string. Physical channels are defined in a corresponding manner for carrying different signallings over the network.

Radio resources are reserved for transmission by assigning the physical channels dynamically either to a circuit-switched or a packet-switched transmission mode. When the circuit-switched transmission mode sets high requirements on the network, a large number of time slots can be reserved for this transmission mode. On the other hand, when the demand for the GPRS transmission mode is great, a large number of time slots can be reserved for this transmission mode.

A terminal which can at the same time have only a circuit-switched or a packet-switched radio connection to a base station of the base station subsystem BSS is called a class B GPRS terminal. This means that if the terminal is in the circuit-switched operation mode (e.g. the terminal is involved in a circuit-switched call), it can neither transmit nor receive packet-switched data, and vice versa. This poses a problem which will be illustrated in the following with reference to FIG. 1, which illustrates some elements of a telecommunications network that are needed to implement circuit-switched and packet-switched services.

The main element of the network infrastructure for GPRS services is a GPRS support node, which in packet-switched transmission corresponds to a mobile switching centre MSC of the GSM network known from circuit-switched transmission. The GPRS support nodes of the GPRS network are divided into serving GPRS support nodes SGSN and gateway GPRS support nodes GGSN. The SGSN is a support node which sends data packets to a terminal MS and receives data packets sent by the terminal MS via a base station subsystem BSS consisting of base stations BTS and base station controllers BSC. The SGSN also maintains, together with GPRS registers (not shown in the figure), location data on terminals that roam in its service area in the GPRS network. The SGSN is typically implemented as a physically separate network element. A GGSN communicating with an SGSN implements switching and cooperation with IP networks 13 (Internet Protocol). Such IP networks include Internet and/or Intranet networks. Reference numeral 12 denotes a server of the IP network which can transmit and receive packet-switched data via the GPRS network.

The mobile switching centre MSC provides circuit-switched services for the terminal MS. One example of circuit-switched services is a circuit-switched call to a telephone 11 of a public switched telephone network PSTN. The call passes between the terminal MS and the telephone 11 via the base station subsystem BSS and the MSC. It is also possible to access IP networks 13 from the PSTN. The radio interface between the terminal MS and the base station subsystem BSS is called a Um interface.

It is now assumed that the terminal MS is in the packet-switched GPRS operation mode and has a TCP/IP connection (Transmission Control Protocol) to a server 12 of the IP network. The server 12 sends packets (TCP/IP packets) from the IP network 13 to the terminal via the GGSN, SGSN and BSS according to the TCP and IP protocols. The amount of data to be transmitted is controlled with the transmission window size. The server 12 may transmit one or more TCP/IP packets at the same time. The terminal MS acknowledges the packets it has received from the server 12 by sending TCP acknowledgement messages to the server according to the TCP protocol, the TCP acknowledgement messages indicating to the server 12 which TCP/IP packets the terminal MS has received.

Even though the terminal MS cannot transmit and receive circuit-switched data when in the packet-switched operation mode, it can, however, receive circuit-switched paging messages. Paging messages are signalling messages which are transmitted to the terminal to signal that there is an incoming call for the terminal.

It is now assumed that a call is made from the telephone 11 of the public switched telephone network PSTN to the terminal MS when it has an ongoing TCP/IP connection with the server 12. In that case the MSC sends a paging message to the terminal. When the terminal receives the paging message, it switches to the GPRS suspend state to allow the terminal user to answer the circuit-switched call. The terminal switches from the GPRS suspend state (circuit-switched operation mode) back to the packet-switched operation mode when the circuit-switched call ends. The duration of a circuit-switched call may be from a few seconds to dozens of minutes. During the call the terminal is in the GPRS suspend state. In that case the TCP/IP connection suffers badly because the terminal cannot transmit or receive packet-switched data in the suspend state, i.e. it cannot receive the TCP/IP packets sent by the server 12 nor send TCP acknowledgement messages to the server.

In general, when the sender transmits TCP/IP packets to the recipient on a TCP/IP connection, a retransmission timer is set according to the TCP protocol. If acknowledgement messages sent from the receiving end do not reach the sender within a set time limit, the retransmission timer expires. The TCP protocol takes care that unacknowledged TCP/IP packets are retransmitted to the recipient. In practice, retransmission is implemented as follows: if the sender does not receive an acknowledgement/acknowledgements to a packet/packets sent, it:

doubles the value of the retransmission timer, sets 1 MSS (Maximum Segment Size) as the size of its TCP transmission window, and retransmits the first unacknowledged TCP/IP packet to the receiving end.

The size of the transmission window is limited to 1 MSS in retransmission to ensure that a large amount of data which might not be received is not sent to the transmission path.

When the terminal MS switches to the GPRS suspend state in the case of an incoming circuit-switched call, the retransmission timer of the server 12 expires because the terminal cannot transmit or receive packet-switched data in the suspend state, and thus the server 12 does not receive acknowledgement messages from the terminal MS within the set time limit. Now the server 12 doubles the value of its retransmission timer, which may originally have been a few seconds, and retransmits the first unacknowledged TCP/IP packet (transmission window size=1 MSS). If the circuit-switched call is still going on, the server does not receive an acknowledgement to this TCP/IP packet, either, and thus the retransmission timer expires again. The server 12 doubles the value of its retransmission timer again and retransmits the TCP/IP packet, etc.

The retransmission timer may expire several times, finally reaching its maximum value, which is usually 60 seconds. If the circuit-switched call is still going on, retransmissions are continued until their number exceeds a preset maximum, in which case the TCP/IP connection is finally aborted.

When the circuit-switched call ends, the terminal returns to the packet-switched operation mode (e.g. by means of a resume procedure), and thus it can again transmit and receive packets of the TCP/IP connection. However, the TCP/IP connection may have been aborted in between, and the data that were transmitted earlier during the TCP/IP connection in question may be lost. Alternatively, even though the TCP/IP connection has not been aborted, unnecessary additional delay is caused before normal transmission of TCP/IP packets can continue. For example, if the retransmission timer has reached its maximum value, it may take even about 60 seconds until any packets are transmitted. This is not optimal use of network resources.

SUMMARY OF THE INVENTION

The present invention provides a new solution to the processing of the suspend state. An object of the invention is to alleviate the above-mentioned disadvantages. A first aspect of the invention relates to a method of managing a suspend state of a packet-switched service in a system which comprises a terminal and another peer, there being a packet-switched connection between the terminal and the other peer over which the terminal and the other peer can transmit packets to each other, the terminal being able to use only either a circuit-switched service or a packet-switched service at the same time.

The method is characterized in that when the terminal switches to the suspend state in the packet-switched service to use a circuit-switched service:

a predetermined first packet is transmitted to said other peer from the terminal to prevent transmission of packets from the other peer to said terminal during the suspend state.

A second aspect of the invention relates to a terminal for managing a suspend state of a packet-switched service in a system which comprises a terminal and another peer, the terminal being arranged to communicate with said other peer on a packet-switched connection over which the terminal is arranged to transmit and receive packets, the terminal being able to use only either a circuit-switched service or a packet-switched service at the same time.

The terminal is characterized in that it comprises:

means for sending a predetermined first packet to the other peer when the terminal switches to the suspend state in the packet-switched service to use a circuit-switched service, said first packet including information for preventing transmission of packets from the other peer to said terminal during the suspend state.

A third aspect of the invention relates to computer software for a terminal for managing a suspend state of a packet-switched service in a system which comprises said terminal and another peer, the terminal being arranged to communicate with said other peer on a packet-switched connection over which the terminal is arranged to transmit and receive packets, the terminal being arranged to be able to use only either a circuit-switched service or a packet-switched service at the same time.

The computer software is characterized in that it comprises a program code:

for transmitting a predetermined first packet from the terminal to the other peer when the terminal switches to the suspend state in the packet-switched service to use a circuit-switched service, said first packet including information for preventing transmission of packets from the other peer to said terminal during the suspend state.

In a preferred embodiment of the invention the above-mentioned packet-switched connection is a TCP/IP connection. The other peer may be any TCP/IP protocol stack in a device that can be connected to a telecommunications network. In a preferred embodiment of the invention the terminal is a class B GPRS terminal but it may also be a terminal of a third-generation network. In a preferred embodiment of the invention the information included in the above-mentioned first packet is value zero of the advertised window field.

BRIEF DESCRIPTION OF THE DRAWINGS

The invention will be described in the following in greater detail with reference to the accompanying drawings, in which.

DETAILED DESCRIPTION

Figure 1:
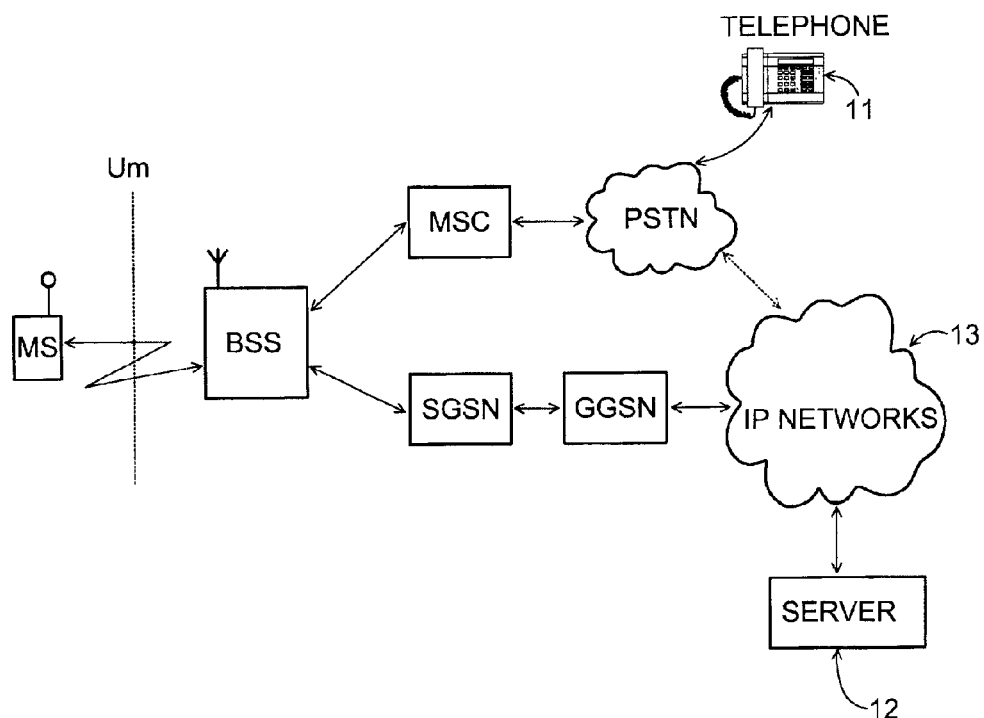
FIG. 1 illustrates elements of a telecommunications network for implementing packet-switched and circuit-switched services.
Figure 2:
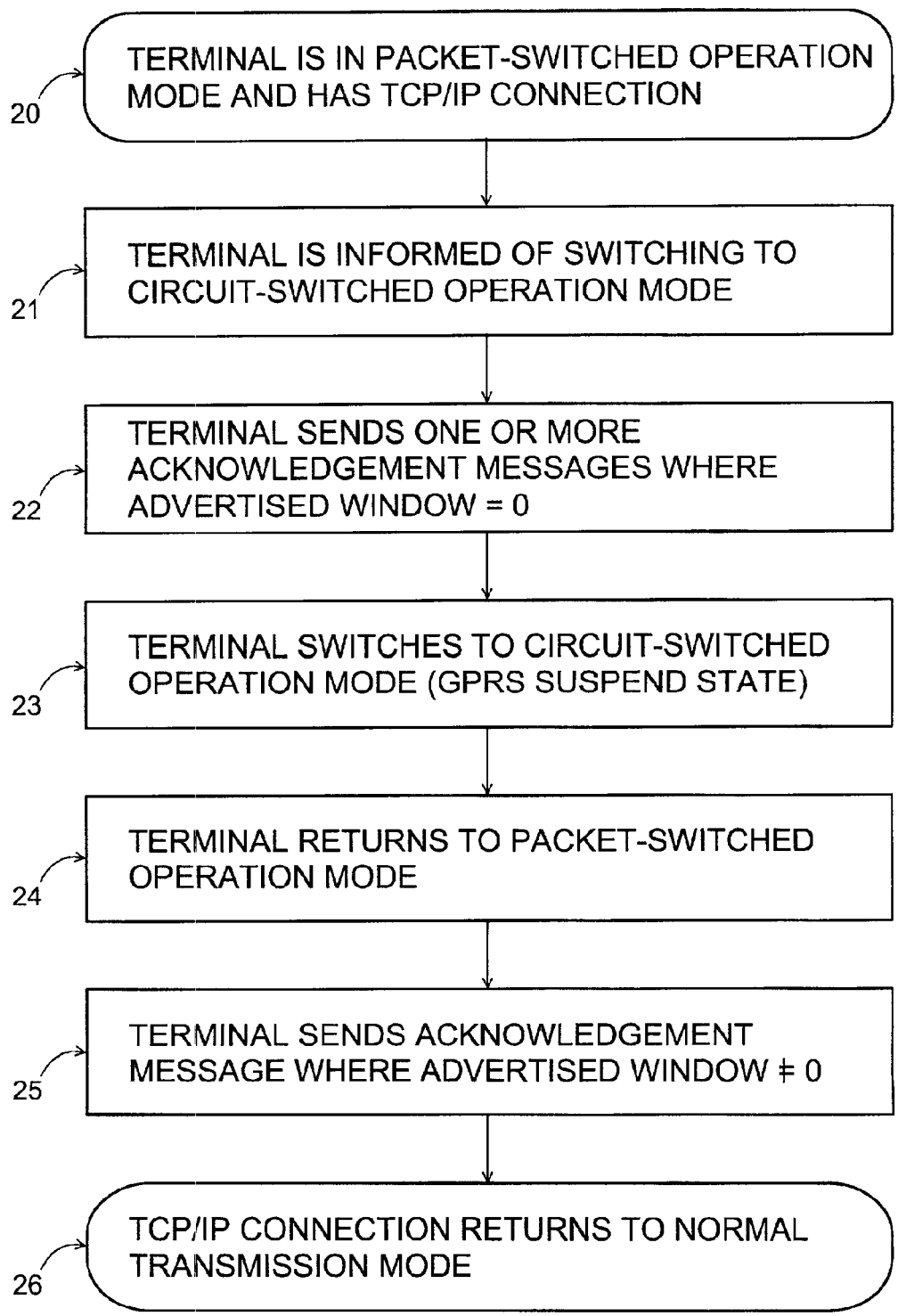
FIG. 2 is a flow chart illustrating a method of the invention.

FIG. 1 was discussed above when the state of the art was described, but reference will also be made to it when the preferred embodiment of the invention is described. FIG. 2 is a flow chart illustrating the method steps according to the preferred embodiment of the invention. In the preferred embodiment of the invention the initial situation is the one shown in FIG. 1 in which the terminal MS is in the packet-switched GPRS operation mode and has a TCP/IP connection to a server 12 of the IP network (block 20). In other words, the GPRS is used as the bearer of the TCP/IP connection. In the preferred embodiment of the invention the terminal MS refers to any device which comprises a TCP/IP protocol stack and is able to use GPRS protocols for external communication. Preferably the terminal MS is a wireless class B GPRS terminal.

On the TCP/IP connection the server 12 sends TCP/IP packets from the IP network 13 to the terminal via the SGSN and BSS according to the TCP and IP protocols. The amount of data to be transmitted is controlled with the TCP transmission window size at the transmitting end. One or more TCP/IP packets can be transmitted at the same time. The terminal MS acknowledges the packets it has received from the server 12 by sending TCP acknowledgement messages to the server according to the TCP protocol, the TCP acknowledgement messages indicating to the server 12 which TCP/IP packets the terminal MS has received. Since the TCP/IP connection is a bi-directional connection, the terminal MS may also send TCP/IP packets to the server 12, which acknowledges the packets it has received with TCP acknowledgement messages.

As regards the TCP/IP packets and TCP acknowledgement messages, it should be noted that the TCP acknowledgement messages are also TCP/IP packets, but for the sake of clarity they are called TCP acknowledgement messages in this specification to separate them from the TCP/IP packets the reception of which is acknowledged by means of these messages.

During the TCP/IP connection the terminal MS is informed that it should switch from the packet-switched operation mode to the circuit-switched operation mode (block 21). The terminal MS receives this information on switching to the circuit-switched operation mode e.g. when it receives a paging message from the MSC informing the terminal MS of an incoming circuit-switched call, such as a voice call or a fax call. In the example of FIG. 1 this call is a voice call which is made from a telephone 11 of the PSTN network. Alternatively, the terminal receives information that it should switch from the packet-switched operation mode to the circuit-switched operation mode when the terminal user performs a certain action to establish a circuit-switched connection from the terminal in question to another terminal when the TCP/IP connection is on. This action may be e.g. selection of a circuit-switched voice, data or fax call.

When the terminal MS receives information that it should switch from the packet-switched operation mode to the circuit-switched operation mode, it switches to the suspend state. In that case the terminal MS typically sends a suspend message to the base station subsystem BSS. The suspend state can also be called a GPRS suspend state as has been done above. The terminal MS switches to the GPRS suspend state to use a circuit-switched service. But just before the terminal switches to the suspend state (or on switching to the suspend state), it sends a suitable number of TCP acknowledgement messages (block 22) to the server 12. In fact, switching to the suspend state is delayed, if necessary, until the TCP acknowledgement messages have been sent. The suitable number of TCP acknowledgement messages may be one, two, three or more. Preferably three TCP acknowledgement messages are sent. The purpose of sending more than one TCP acknowledgement message is to ensure that at least one of the TCP acknowledgement messages is received by the server 12 with a high probability.

Particularly if the switching to the suspend state by the terminal MS is a multi-stage process, the above-mentioned TCP acknowledgement messages can be alternatively sent during the actual process, e.g. between certain process steps.

A TCP acknowledgement message includes an advertised window field (or a similar field), the value of the field showing the amount of data/number of data units a terminal MS can receive at any given moment. The advertised window parameter has also been called a window advertisement or a receiver window in some other contexts.

The sender of the TCP/IP packet uses the advertised window parameter (RWND) given by the recipient of the TCP/IP packet to determine the size of its transmission window (WND) together with a congestion window parameter (CWND), which is continuously updated by the sender. The following comparison is used for determining the transmission window size (WND):

$$WND=MIN(CWND, RWND)$$

where the MIN function selects the transmission window size on the basis of the parameter (CWMD or RWND) that has a smaller value.

According to the invention, the terminal MS sets zero as the value of the advertised window field in the TCP acknowledgement messages it sends just before switching to the suspend state. When the server 12 receives a TCP acknowledgement message where the value of the advertised window field is zero, the server sets zero as its transmission window size, i.e. aborts transmission of TCP/IP packets to the terminal MS.

If the terminal MS has not received any new unacknowledged TCP/IP packets before it switches to the suspend state, it can retransmit copies of the latest TCP acknowledgement message to the server 12; however, in these messages the value of the advertised window field is zero.

In addition to the fact that the terminal MS sends the above-mentioned TCP acknowledgement messages just before it switches to the suspend state, the terminal also aborts transmission of its own TCP/IP packets to the server 12 in a controlled manner. As regards the retransmission of TCP/IP packets, there are two options. The terminal MS may switch its retransmission timer off and switch it on after the terminal has resumed the packet-switched operation mode. Alternatively, the terminal, having switched to the suspend state, allows its retransmission timer to expire normally. In that case the terminal does not, however, react to the expiry of the retransmission timer at once according to the invention (it does not immediately try to retransmit the first unacknowledged TCP/IP packet), but it first stores the fact that the timer has expired. The terminal MS does not react to the expiry of the timer until the terminal has switched from the suspend state back to the packet-switched operation mode. This prevents upsetting of the internal function related to the TCP/IP stack of the terminal during the suspend state.

Having sent the TCP acknowledgement messages the terminal switches to the suspend state (block 23) to use a circuit-switched service, and consequently the terminal MS user can answer a call made from the telephone 11 and/or use other circuit-switched services.

When the use of circuit-switched services ends, the terminal MS returns to the packet-switched operation mode (e.g. by means of a resume procedure which is automatic from the user's point of view) (block 24) and thus the terminal can again transmit/receive packets of the TCP/IP connection normally. The terminal continues transmission of TCP/IP packets and/or TCP/IP acknowledgement messages in a controlled manner from the point where the transmission of packets/messages was terminated as the terminal switched to the suspend state. If the terminal switched its retransmission timer off when it switched to the suspend state, it now switches the timer on. If the terminal allowed its retransmission timer to expire before switching to the suspend state, it reacts to the expiry of the timer at this point (performs the steps related to retransmission).

Having resumed the packet-switched operation mode the terminal MS sends one or more TCP acknowledgement messages to the server, the value of the advertised window field in the message being different from zero (block 25). Preferably the number of TCP acknowledgement messages to be sent is three so that the server 12 would receive at least one of the TCP acknowledgement messages with a high probability.

Alternatively, if a TCP/IP packet intended for the server 12 is first in the transmission order at the terminal MS after it has resumed the packet-switched operation mode, the terminal first sends this TCP/IP packet to the server 12 instead of a TCP acknowledgement message, but sets a value differing from zero for the advertised window field of this TCP/IP packet.

Having received a packet in which the value of the advertised window field differs from zero from the terminal MS, the server 12 increases the size of its transmission window from zero to a predetermined value differing from zero and starts to transmit TCP/IP packets of the TCP/IP connection normally to the terminal MS. Thus the normal transmission mode (block 26) has been resumed on the TCP/IP connection.

Figure 3:
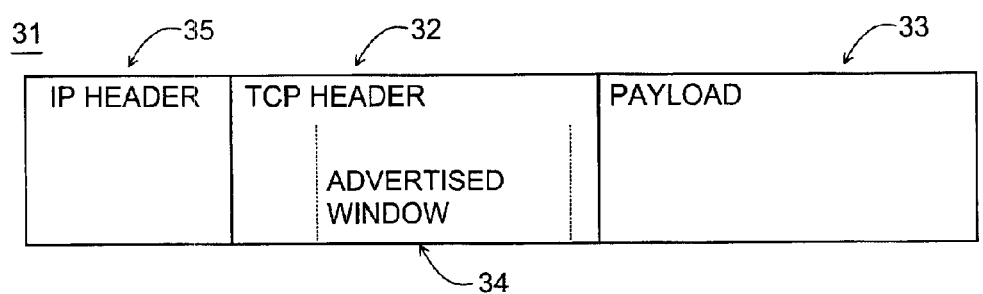
FIG. 3 illustrates the structure of a TCP/IP packet.

FIG. 3 is a rough illustration of the structure of a TCP/IP packet in view of the present invention. A person skilled in the art knows that a TCP/IP packet may comprise other fields in addition to the fields shown in FIG. 3. The TCP/IP packet 31 comprises an IP header 35, a TCP header 32 and a payload part 33. The TCP header 32 comprises the above-mentioned advertised window field 34, the value of which indicates the amount of data/number of data units the sender of the TCP/IP packet/acknowledgement 31 is prepared to receive. The IP header 35 and TCP header 32 also comprise a number of fields which contain information on the sender and recipient of the TCP/IP packet 31, on the ordinal number and on error correction, for example. The actual data to be transmitted are in the payload part 33. The TCP acknowledgement messages mentioned above do not typically include any payload part 33.

Figure 4:
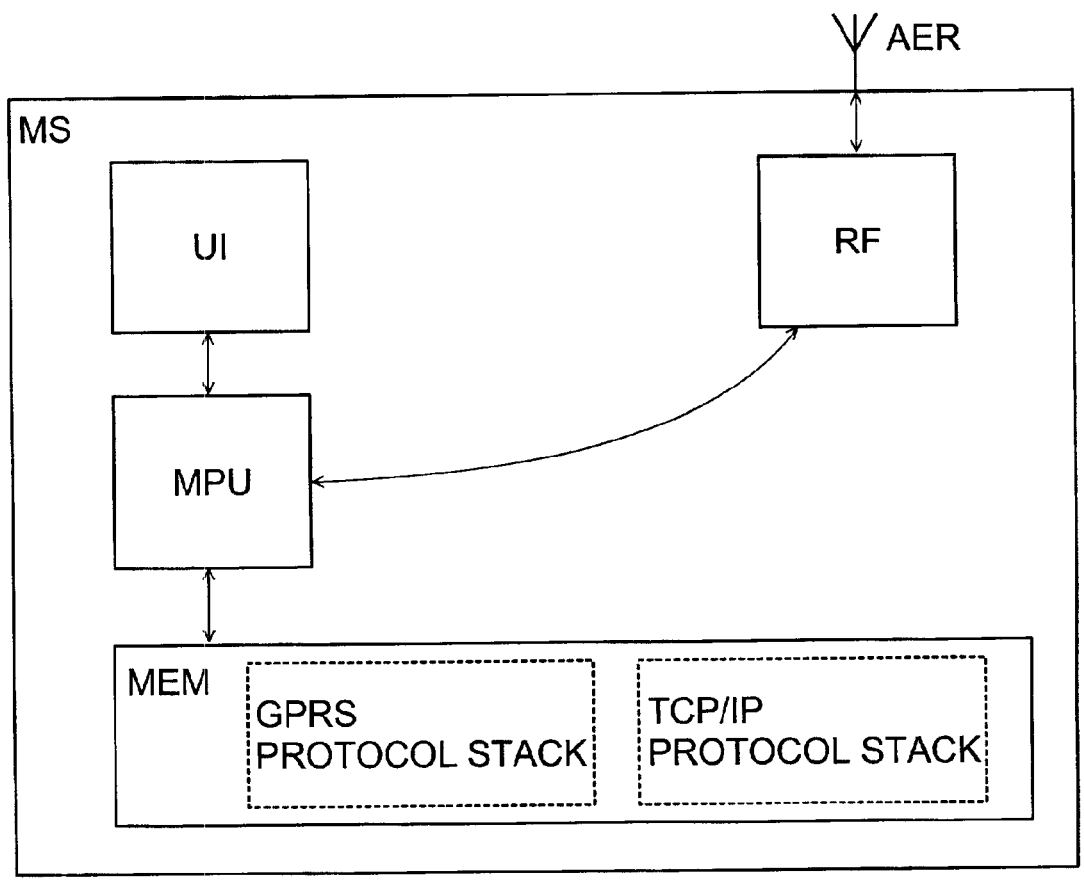
FIG. 4 is a block diagram illustrating a terminal suitable for implementing the invention.

FIG. 4 illustrates components that are relevant to the function of a terminal MS suitable for implementing the invention. The terminal is preferably a class B GPRS terminal. The terminal MS comprises a processor MPU and the following functional parts connected to the terminal: a memory MEM, a user interface UI and a radio part RF. The processor MPU is preferably a microprocessor, a microcontroller or a digital signal processor DSP. The memory MEM preferably comprises a read only (non-volatile) memory ROM and a random access memory RAM. The radio part RF can transmit and receive radio-frequency signals with its antenna AER e.g. to and from a base station in the base station subsystem BSS (FIG. 1) both in the circuit-switched and in the packet-switched transmission mode. The user interface UI typically provides a display and a keyboard for the user for using the terminal MS.

The software of the terminal MS is typically stored in the read only memory. The GPRS and TCP/IP protocols are also stored in this memory. The processor MPU controls the function of the mobile station MS by means of the software, such as the use of the radio part RF, display of messages with the user interface UI and reading of inputs received from the user interface UI. The processor MPU uses the random access memory as a temporary buffer memory in data processing.

The GPRS protocol stack informs the TCP/IP protocol stack of the switch to the GPRS suspend state, in which case the TCP/IP protocol stack rapidly generates TCP acknowledgement messages in which the value of the advertised window field is zero. The GPRS stack sends the TCP acknowledgement messages just before the terminal MS switches to the suspend state. Correspondingly, the GPRS protocol stack informs the TCP/IP protocol stack of the termination of the GPRS suspend state. The informing is typically carried out in a certain software process.

The invention is implemented by software. Changes are needed only in the software of the terminal MS. No changes are needed in the implementation of the TCP/IP stack of the other peer. By means of the invention the TCP/IP connection can be maintained in a controlled manner during the GPRS suspend state and thus the data transferred earlier on the TCP/IP connection are not lost. Transmission of packets on the TCP/IP connection continues after the interruption from the point where it was aborted on switching to the suspend state. Furthermore, no unnecessary additional delay is caused when the terminal switches from the suspend state back to the packet-switched operation mode.

The invention can be applied in a terminal of a third-generation network, such as a WCDMA terminal, for processing the suspend state in the same manner as has been described in this specification.

The implementation and embodiments of the invention have been described by means of examples above. It is obvious to a person skilled in the art that the invention is not limited to the details of the embodiments described above and the invention can be implemented otherwise without deviating from the characteristics of the invention. For example, the TCP/IP connection may exist between the terminal MS and any other peer that can communicate according to the TCP/IP protocols instead of the terminal MS and the server 12 of the IP network. The packet-switched connection mentioned in the claims may be, instead of the TCP/IP connection, any other similar packet-switched connection.

The embodiments described above should be regarded as illustrative but not as restrictive. Thus the embodiments and applications of the invention are limited only by the appended claims. The alternative embodiments of the invention defined in the claims, including equivalent embodiments, fall within the scope of the invention.

What is claimed is:

1. A method of managing a suspend state of a packet-switched service in a system which comprises a terminal and another peer, there being a packet-switched connection between the terminal and the other peer over which the terminal and the other peer transmit packets to each other, the terminal being able to use only either a circuit-switched service or a packet-switched service at the same time, wherein in a situation in which the terminal switches to the suspend state in the packet-switched service to use a circuit-switched service:

a predetermined first packet is transmitted from the terminal to the other peer to prevent transmission of packets from the other peer to said terminal during the suspend state, wherein the transmission of packets from the other peer to the terminal is controlled by a transmission window size parameter, and the first packet indicates to the other peer a transmission window size parameter value zero to prevent transmission.

2. A method according to claim 1, further comprising transmitting said first packet before switching to the suspend state.

3. A method according to claim 1, wherein the switching to the suspend state by the terminal is a multi-stage process, and said first packet is transmitted during said process.

4. A method according to claim 1, wherein the method comprises delaying the switching to the suspend state by the terminal to transmit said first packet.

5. A method according to claim 1, wherein said packet-switched connection is a TCP/IP connection (Transmission Control Protocol/Internet Protocol) and said packets are TCP/IP packets.

6. A method according to claim 1, further comprising transmitting more than one of said first packets to prevent transmission of the packets from the other peer.

7. A method according to claim 1, wherein said transmission window size parameter value zero is value zero of an advertised window parameter.

8. A method according to claim 1, wherein the method further comprises aborting transmission of packets by the terminal in a controlled manner as the terminal switches to the suspend state.

9. A method according to claim 8, wherein the terminal comprises a retransmission timer and that retransmission of the packets by the terminal is aborted by switching said retransmission timer off.

10. A method according to claim 8, wherein the terminal comprises a retransmission timer and that retransmission of the packets by the terminal is aborted by allowing the retransmission timer to expire and by delaying reacting to the expiry of the retransmission timer.

11. A method according to claim 10, wherein on returning from the suspend state back to the packet-switched service the terminal reacts to the expiry of said retransmission timer by performing retransmission.

12. A method according to claim 10, wherein said delaying of the reacting to the expiry of the retransmission timer means that retransmission of the packets is delayed.

13. A method according to claim 1, wherein in a situation in which the terminal switches from said suspend state back to the packet-switched service:

a predetermined second packet is transmitted from the terminal to said other peer to continue transmission of packets from the other peer to the terminal.

14. A method according to claim 13, wherein said second packet indicates a second value of said transmission window size parameter to the second peer to continue transmission of packets from the other peer to the terminal.

15. A method according to claim 14, wherein said second value of the transmission window size parameter differs from the value zero.

16. A method according to claim 13, wherein said second packet is a TCP/IP packet.

17. A method according to claim 13, wherein the terminal, on switching from the suspend state back to the packet-switched service, returns to normal packet transmission operation.

18. A method according to claim 13, further comprising transmitting more than one of said second packets.

19. A method according to claim 9, wherein on returning from the suspend state back to the packet-switched service the terminal switches its retransmission timer on.

20. A terminal for managing a suspend state of a packet-switched service in a system which comprises a terminal and another peer, the terminal being arranged to communicate with said other peer on a packet-switched connection over which the terminal is arranged to transmit and receive packets, the terminal being able to use only either a packet-switched service or a circuit-switched service at the same time, wherein the terminal comprises:

means for transmitting a predetermined first packet to the other peer in a situation in which the terminal switches to the suspend state in a packet-switched service to use a circuit-switched service, said first packet including information for preventing transmission of packets from the other peer to said terminal during the suspend state, wherein said information included in the first packet comprises a transmission window size parameter value zero to prevent transmission.

21. Software for a terminal for managing a suspend state of a packet-switched service in a system which comprises said terminal and another peer, the terminal being arranged to communicate with said other peer on a packet-switched connection over which the terminal is arranged to transmit and receive packets, the terminal being arranged to be able to use only either a packet-switched or a circuit-switched service at the same time, wherein the software comprises a program code:

for transmitting, a predetermined first packet from the terminal to the other peer in a situation in which the terminal switches to the suspend state in the packet-switched service to use a circuit-switched service, said first packet comprising information for preventing transmission of packets from the other peer to said terminal during the suspend state, wherein said information included in the first packet comprises a transmission window size parameter value zero to prevent transmission.

* * * * *